US012794851B2

(12) United States Patent
Yuan et al.

(10) Patent No.: US 12,794,851 B2
(45) Date of Patent: *Nov. 10, 2026

(54) LEVERAGING CONTEXTUAL METADATA COMMUNICATION TO IMPROVE DNS SECURITY

(71) Applicant: Cisco Technology, Inc., San Jose, CA (US)

(72) Inventors: Barry Qi Yuan, Vancouver (CA); Robert Edgar Barton, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 18/928,456

(22) Filed: Oct. 28, 2024

(65) Prior Publication Data

US 2025/0055829 A1 Feb. 13, 2025

Related U.S. Application Data

(63) Continuation of application No. 17/862,019, filed on Jul. 11, 2022, now Pat. No. 12,255,868.

(51) Int. Cl.
*H04L 61/4511* (2022.01)
*H04L 9/32* (2006.01)
*H04L 61/2514* (2022.01)

(52) U.S. Cl.
CPC ........ *H04L 61/4511* (2022.05); *H04L 9/3236* (2013.01); *H04L 61/2514* (2013.01)

(58) Field of Classification Search
CPC ............... H04L 61/4511; H04L 9/3236; H04L 61/2514; H04L 2101/69; H04L 61/59
See application file for complete search history.

(56) References Cited

U.S. PATENT DOCUMENTS 8,407,194 B1 3/2013 Chaput et al.
9,634,943 B2 * 4/2017 Jungck ................ H04L 41/5054
(Continued)

FOREIGN PATENT DOCUMENTS

EP 3035650 B1 6/2019

OTHER PUBLICATIONS

Contalli, et al., Client Subnet in DNS Queries', RFC7871.txt, Internet Engineering Task Force, IETF; Standard, Internet Society (ISOC) 4, Rue Des Falaises ch- 1205 Geneva Switzerland, May 20, 2016, Sections 1 and 5, p. 1- p. 30.
(Continued)

*Primary Examiner* — Alex Tran
(74) *Attorney, Agent, or Firm* — Lee & Hayes, P.C.

(57) ABSTRACT

Techniques for leveraging efficient metadata communications to improve domain name system (DNS) security are described. The DNS service receives metadata associated with a client device on an encrypted channel. The DNS service applies a cryptographic hash function to the metadata to determine a first hash value and stores the first hash value in a metadata registry record with the corresponding client device metadata. The DNS service receives a DNS query containing a second hash value in an additional records section and determines that the second hash value corresponds to the first hash value. Based at least in part on the second hash value corresponding to the first hash value and the metadata associated with the client device, the DNS service resolves the DNS query and transmits a DNS response including the second hash value.

20 Claims, 5 Drawing Sheets

(56) References Cited

U.S. PATENT DOCUMENTS

| | | | | |
|---|---|---|---|---|
| 11,019,022 | B1 * | 5/2021 | Thornewell | H04L 67/1001 |
| 11,552,925 | B1 * | 1/2023 | Craciun | H04L 63/0428 |
| 11,570,144 | B2 * | 1/2023 | Buck | H04L 61/4511 |
| 11,601,466 | B2 * | 3/2023 | Lee | H04L 63/0209 |
| 12,009,968 | B1 * | 6/2024 | Abed | H04L 61/4511 |
| 2010/0269174 | A1 | 10/2010 | Shelest | |
| 2013/0173769 | A1 | 7/2013 | Seastrom et al. | |
| 2015/0163245 | A1 * | 6/2015 | Kondamuru | H04L 63/08 726/6 |
| 2017/0064749 | A1 * | 3/2017 | Jain | H04L 67/1097 |
| 2017/0317968 | A1 | 11/2017 | Droms et al. | |
| 2018/0173799 | A1 * | 6/2018 | McGarvey | G06F 16/951 |
| 2019/0097965 | A1 | 3/2019 | Linari et al. | |
| 2021/0234899 | A1 | 7/2021 | Trifilo et al. | |
| 2021/0392110 | A1 * | 12/2021 | Barnett | H04L 63/0236 |
| 2022/0140996 | A1 * | 5/2022 | Cebere | H04L 61/2539 713/159 |
| 2022/0385474 | A1 * | 12/2022 | Helfinstine | H04L 9/40 |
| 2024/0015132 | A1 | 1/2024 | Yuan et al. | |
| 2025/0258612 | A1 * | 8/2025 | Szabó | G06F 3/067 |

OTHER PUBLICATIONS

Office Action for U.S. Appl. No. 17/862,019, mailed on May 24, 2023, Barry Qi Yuan, "Leveraging Contextual Metadata Communication to Improve DNS Security", 17 pages.

Office Action for U.S. Appl. No. 17/862,019, mailed on Nov. 7, 2023, Inventor #1 Barry Qi Yuan, "Leveraging Contextual Metadata Communication to Improve DNS Security," 25 pages.

Office Action for U.S. Appl. No. 17/862,019, mailed on May 9, 2024, Inventor #1 Barry Qi Yuan, "Leveraging Contextual Metadata Communication to Improve DNS Security," 29 pages.

PCT Search Report and Written Opinion mailed Sep. 28, 2023 for PCT Application No. PCT/US23/27055, 14 pages.

* cited by examiner

LEVERAGING CONTEXTUAL METADATA COMMUNICATION TO IMPROVE DNS SECURITY

RELATED APPLICATIONS

This application claims priority to U.S. patent application Ser. No. 17/862,019, filed on Jul. 11, 2022; the entire contents of which are incorporated herein by reference.

TECHNICAL FIELD

The present disclosure relates generally to utilizing a hash value to represent client and client device metadata in a Domain Name System (DNS) query where the real metadata is sent through an out-of-band encrypted channel.

BACKGROUND

A Domain Name System (DNS) query is generally used to obtain an Internet Protocol (IP) address corresponding to a particular domain name on the Internet. Essentially, DNS functions like "the phonebook of the Internet." A user may access information on the Internet through domain names, like cisco.com, whereas a web browser interacts through IP addresses. DNS is used to translate a domain name to an IP address so browsers can load an Internet resource on a client device for a user.

Today, there are more and more types of networked devices, Information Technology (IT), Operational Technology (OT), virtual machines (VMs), containers, mobile, etc. Due to the vast differences in nature of the varied networked devices, it can become difficult to apply the same security controls across the devices. Additionally, traditional approaches do not provide enough visibility of the client. For example, clients that are behind Network Address Translation (NAT) make it more difficult for a DNS service to know the actual IP address or identity of the client, especially with OT devices, or service provider networks. For instance, when a service provider is operating a mobile network where clients are on private IP addresses, the DNS service can only see their public IP address and not their private IP address. This results in difficulty when trying to enforce a differentiated security policy for a client or client device with a private IP address that the DNS service cannot see. Current solutions add metadata, such as the private IP address of the client device, in a DNS query. However, this approach is severely limited as a DNS message is limited to 512 bytes, and even with the advent of Extension Mechanisms for DNS (EDNS), option (OPT) pseudo-resource records (pseudo-RR) provide space for only 16 flags. Thus, the amount of metadata that may be sent is severely limited. This may result in the DNS service not having sufficient information for describing the client or client device in order to enforce the correct security policy. In addition, when this metadata is added directly into a DNS message, the packets grow larger and larger, resulting in slow data transfer. Thus, an approach that does not limit the metadata that can be sent in a DNS message while at the same time, limiting the size of packets to increase data speed is needed.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
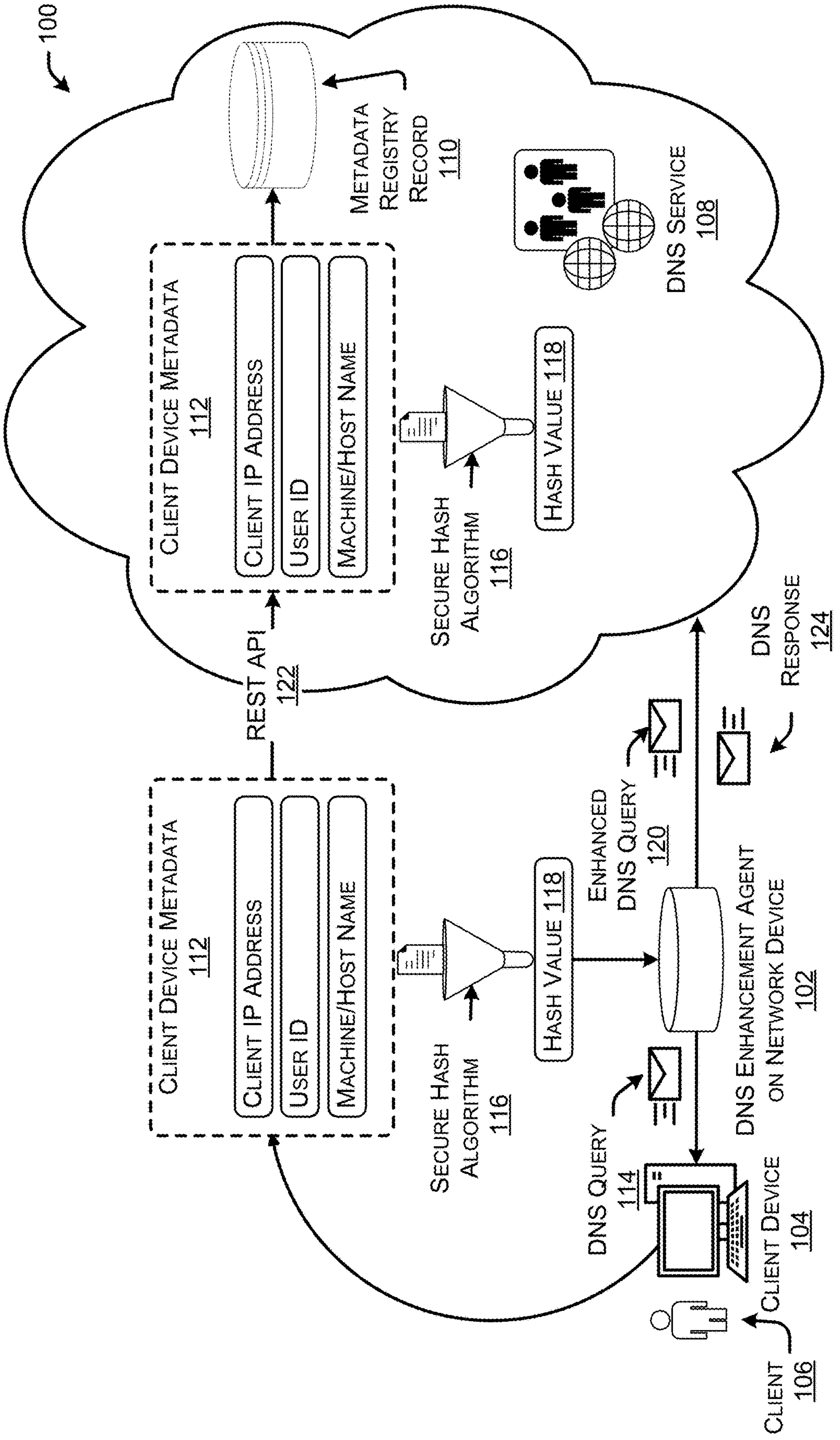
FIG. 1 illustrate a system-architecture diagram of an example environment for implementing at least some of the various technologies disclosed herein. The environment includes a DNS enhancement agent that enhances a DNS query sent from a client device to a DNS service.

This disclosure describes a method for leveraging efficient meta data communication using a hash function to improve DNS security. The method includes intercepting a first Domain Name System (DNS) query from a client device. Further, the method includes applying a cryptographic hash function to metadata associated with the client device to generate a hash value. In some instances, the method may include adding the hash value to an additional records section of the first DNS query to generate a second DNS query. The method may also include transmitting the second DNS query to a DNS service. Further, the method may include transmitting the metadata associated with the client device to the DNS service on an out-of-band encrypted channel. Additionally, the method may include receiving, from the DNS service, a DNS response including the hash value and transmitting the DNS response to the client device.

Additionally, or alternatively, the method includes determining that the first DNS query contains a destination address for a first DNS server that does not comply with a requirement, and overwriting the destination address for a second DNS server in the first DNS query that complies with the requirement.

Additionally, or alternatively, in some instances, the first DNS query is an Extension Mechanisms for DNS (EDNS) query and the hash value is added as an option (OPT) type pseudo-Resource Record (pseudo-RR) in the additional records section of the EDNS query.

Additionally, or alternatively, in some cases, the metadata associated with the client device is transmitted by an out-of-band Representational State Transfer (REST) Application Programming Interface (API) and stored in a registry at the DNS service.

Additionally, or alternately, the method may include applying a security policy based on the metadata associated with the client device included in the hash value. In some instances, the security policy may be applied to a client device private IP address that is behind a Network Address Translation (NAT) public IP address.

Additionally, or alternately, in some implementation the method may further include detecting a change in the metadata associated with the client device, and transmitting the metadata associated with the client device, including the change, to the DNS service on the out-of-band encrypted channel.

This disclosure describes an additional method for leveraging efficient meta data communication using a hash function to improve DNS security. The method includes receiving, at a DNS service, a DNS query containing a hash value in an additional records section. The method may also include, receiving, at the DNS service, metadata associated with the client device on an out-of-band encrypted channel. In some instances, the method may also include determining, by the DNS service, the hash value from the DNS query. The method may further include, mapping, by the DNS service, the hash value to the metadata associated with the client device using a cryptographic hash function, and transmitting, by the DNS service, a DNS response including the hash value.

In some instance, the metadata associated with the client device is received from an out-of-band REST API.

Additionally, or alternately, the method may further include, detecting, by the DNS service, a change in the metadata associated with the client device based on a new hash value, and transmitting a new REST API call that includes the change in the metadata associated with the client device.

In some cases, the DNS query is an EDNS query, and the hash value is an OPT type pseudo-RR in the additional records section of the EDNS query and the DNS response is an EDNS response, and the hash value is an OPT type pseudo-RR in the additional records section of the EDNS response.

Additionally, or alternately, the method may include applying a security policy based on the metadata associated with the client device included in the hash value. In some cases, the security policy is applied to a client device private IP address behind a NAT public IP address.

The techniques described in this disclosure may be performed as a method and/or by a system having non-transitory computer-readable media storing computer-executable instructions that, when executed by one or more processors, performs the techniques described above.

Example Embodiments

As discussed above, due to the differences in the vast types of devices operating across networks today, such as information technology (IT), operational technology (OT), virtual machines (VM), containers, etc., it is difficult to enforce Domain Name System (DNS) security measures. For example, when clients with private Internet Protocol (IP) addresses are operating behind Network Address Translation (NAT), a DNS service cannot see the individual clients private IP addresses, instead only their public IP addresses will be seen. To circumvent this issue, Extension Mechanism for DNS (EDNS) was implemented, which adds 16 flags in an additional record section of a EDNS message. (Although DNS is generally used herein to describe a Domain Name System query and response, it should be noted that Extension Mechanism for DNS and the properties that the EDNS provides, is assumed to be in use for the queries and responses described.) By using EDNS the private IP address of a client device, or other relevant metadata to be able to enforce a differentiated security policy, can be added to an option (OPT) pseudo-Resource Record (pseudo-RR) of the additional records section of a DNS query. However, as discussed above, this presents the additional problem of increasing packet size, resulting in slow data transfer while still limiting the added metadata to 16 flags.

Sending client device metadata in the OPT pseudo-RR in the additional records section of a DNS request sent to a DNS service, provides accurate and real time client device information which helps ensure that a granular and correct policy can be applied to the client device and the that the DNS lookup reports are accurate. However, multiple OPT pseudo-RR will consume additional payload in the DNS query causing packets that are increasingly large in size, resulting in less efficiency, packets that use more bandwidth, and cause a delay in data traffic. Additionally, there is an upper limit on the amount of metadata that can be sent with a single query (a DNS query is usually limited to 512 bytes) and OPT pseudo-RR only provide space for up to 16 flags. These limitations may result in the same client device sending duplicate OPT pseud-RR to the DNS service unnecessarily.

This disclosure describes techniques for a light weight containerized DNS enhancement application or agent that resides on an endpoint or a network device that intercepts DNS traffic, applies policy enforcement, and enriches the DNS query with relevant contextual metadata for cloud security solutions. The DNS enhancement application or agent can be an application or agent on a managed endpoint, on premises or roaming. Alternately or in addition, the DNS enhancement application or agent may be a container or VM deployed on a network device, (e.g., router, switch, firewall, etc.). Further, the DNS enhancement application or agent may be a standalone hardware device deployed inline at an enterprise network edge or service provider edge. Additionally, the DNS enhancement application or agent may be deployed on any combination of endpoint, network device, and inline standalone hardware device at an enterprise network and/or service provider network.

The DNS application or agent intercepts DNS traffic sent from endpoint client devices and determines if the current configured destination DNS server complies with enterprise policy. If not, the DNS server destination configuration is overwritten with a destination address for a DNS server that does comply with enterprise policy. This may be applied as a simple override to the DNS setting, or in another example it may be through a locally instantiated firewall rule on the network device that is running the DNS enhancement application or agent that intercepts the DNS traffic, and rewrites the destination address to the compliant DNS server.

The DNS enhancement application or agent applies a cryptographic hash function (e.g., any secure hash algorithm such as SHA256) to contextually relevant metadata describing the client and client device from which a DNS query originates, and adds the resulting hash value as an OPT pseudo-RR to an additional records section of the DNS query. In some cases, to add additional security, salt may be added to the hash to ensure a unique output for a set of contextually relevant metadata describing a particular client and client device. For example, the contextually relevant metadata may include, but is not limited to, client device private IP address, geolocation, username, domain name, machine or host name, open roaming ID, mobile device management (MDM) profile, antivirus information, and any other metadata that describes a client and client device that may be relevant for security and policy enforcement purposes. The real values of the contextually relevant metadata are sent to the DNS service on an out-of-band encrypted channel. For instance, a Representational State Transfer Application Programming Interface (REST API) may be used to send the real values of the metadata to the DNS service where the real values of the metadata are stored in a metadata registry record. Additional examples may involve a remote procedure call, a file transfer protocol (FTP) upload, or even blockchain. The real values of the contextually relevant metadata are not limited to transmission on an out-of-band encrypted channel. Alternately or in addition, the real values of the contextually relevant metadata may be sent to the DNS service on any encrypted channel. For instance, an inline encrypted channel through DNS and/or an out-of-band channel.

Once the real values of the metadata have been sent to the DNS service through the REST API, as long as there is no metadata change, the hash value does not change and there is no need to upload client metadata information to the metadata registry record. In other words, client device metadata, is uploaded through REST API and stored in the metadata registry record once unless the metadata changes. When any of the real values of metadata change (e.g., a new user logs into a system resulting in a client ID change or username change), then the corresponding field(s) is updated, the cryptographic hash function is applied and a new hash value is generated, triggering a new REST API call that indicates the change in the metadata associated with the client and/or client device, and the updated real values are sent to the DNS service and stored in the metadata registry record.

Once a DNS query is enhanced with a hash value, the enhanced DNS query is sent to the DNS service (e.g., Umbrella DNS). The DNS service processes the enhanced DNS query by extracting the hash value from the OPT pseudo-RR in the additional records section of the enhanced DNS query. The DNS service then maps the hash value to the real values of the metadata stored in the metadata registry record, resolves the DNS query, and sends back a DNS response to the client device from which the DNS query originated. The DNS response contains the same hash value in an OPT pseudo-RR of the additional records section of the DNS response. This helps to avoid or identify forged and unauthorized responses, as an unauthorized DNS response will not contain the hash value in the additional records section of the DNS response that was sent in the DNS query in the additional records section.

Leveraging a DNS enhancement application or agent to generate a hash value representing client and client device metadata in a DNS query sent to a DNS service, and sending the real values of the metadata on an out-of-band encrypted channel to the DNS service, provides for a dramatically reduced size of DNS queries and responses, enhanced efficiency, and avoidance of the DNS queries and responses being dropped or truncated. While the same time, these techniques also provide for suppling the DNS service with the same or increased levels of client device information. Because the DNS enhancement service uses a hash value to represent the client device metadata, there is no limit to the amount of metadata that can be included in a DNS query. The generated hash value is of a predetermined size, regardless of the amount of metadata the hash value represent. Thus, there is no size constraint on the amount of metadata included in the DNS query that describes the client and client device even though the OPT pseudo-RR section is limited to 16 flags and a DNS query size is limited to 512 bytes. Compared to a conventional EDNS query that includes client device metadata directly in the query itself as an OPT pseudo-RR, an enhanced DNS query using a hash value in an OPT pseudo-RR to represent the client device metadata, has a packet size reduction of up to 90% while at the same time, not limiting the amount of metadata that can be included in the hash value in the enhanced DNS query.

Further, implementing a DNS enhancement application or agent simplifies security deployment and device management, as IT or managed service providers do not need to apply configurations at an endpoint either manually or through Dynamic Host Configuration Protocol (DHCP) to make sure their DNS server setting is correctly pointing to the right DNS server. The DNS enhancement application or agent ensures that the DNS query is pointing to a DNS server according to enterprise policy and overwriting the DNS query to point to a destination address of the approved DNS server according to enterprise policy if not already included. Thus, enforcement of security policies is simplified across IT, OT, VMs, containers, mobile, and other devices.

FIG. 1 illustrates a system-architecture diagram of an example environment 100 for implementing at least some of the various technologies disclosed herein. The environment 100 includes a DNS enhancement agent 102 deployed on a network device. Although illustrated in FIG. 1 as a container or VM on a network device, the DNS enhancement agent can alternately or in addition be deployed on an endpoint device such as client device 104, or a separate hardware device deployed inline at an enterprise network edge or service provider edge. Additionally, FIG. 1 illustrates a client 106 at the client device 104, a DNS service 108, such as Umbrella DNS, and a metadata registry record 110 at the DNS service 108 for storing the real values of client and client device metadata 112. The metadata registry record 110 may be any type of memory suitable for data storage. For example, the metadata registry record 110 may be an in memory table where the client device metadata 112 is stored, or it may be a separate database or other repository where the client device metadata 112 is stored. The client and client device metadata 112 may include a client IP address, a user ID, and a machine or host name as shown. However, the metadata is not limited to what is illustrated and may include any metadata that is relevant to the client and/or client device and necessary for determining an appropriate policy to apply to the client device when in use by the client 106.

The DNS enhancement agent 102 intercepts a DNS query 114 sent from the client device 104. The DNS enhancement agent 102 checks to see if the current configured DNS server destination complies with enterprise policy. If it does not, the DNS server configuration is overwritten with a DNS server destination that does comply with enterprise policy. The DNS enhancement agent 102 then applies a cryptographic hash function, like the secure hash algorithm 116 illustrated in FIG. 1, to client and client device metadata 112 to generate a hash value 118. Optionally, is some instances, salt may be added to the hash. A random, unique value may be added to the end of the client device metadata 112 before the secure hash algorithm 116 is applied to further ensure security. The DNS enhancement agent 102 adds the hash value to an additional records section of the DNS query 114 as an OPT pseudo-RR. The resulting enhanced DNS query 120, with the approved DNS server destination and the added hash value 118, is then sent from the DNS enhancement agent 102 on to the DNS service 108.

The real values of client and client device metadata 112, are sent to the DNS service 108 on and out-of-band encrypted channel such as through a REST API 122 illustrated in FIG. 1. The client device metadata 112 is saved in a metadata registry record 110. Once the enhanced DNS query 120 reaches the DNS service 108, the DNS service processes the enhanced DNS query 120 by extracting the hash value 118 from the OPT pseudo-RR in the additional record section of the enhanced DNS query 120. The DNS service 108 maps the hash value 118 to the real client device metadata 112, stored in the metadata registry record, using the same secure hash algorithm 116 as was used to generate the hash value 118. The DNS service resolves the DNS query, and sends back a DNS response 124 to the client device 104 from which the DNS query 114 originated. The DNS response 124 contains the same hash value 118 in the OPT pseudo-RR of the additional records section of the DNS response 124.

Figure 2:
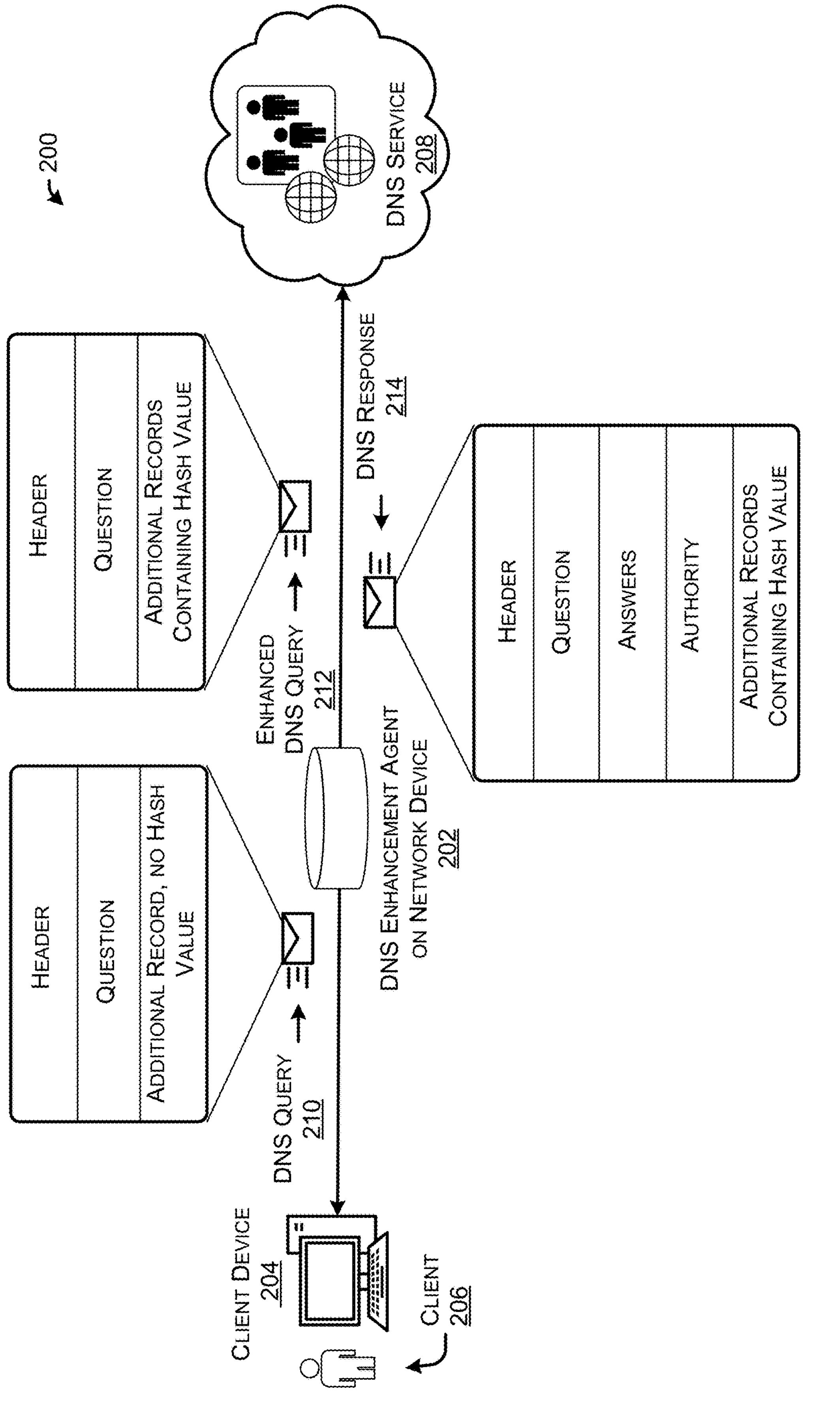
FIG. 2 illustrates a network device executing a DNS enhancement agent and illustrates a DNS query that has been enhanced with a hash value.

FIG. 2 further illustrates an example environment 200 showing DNS traffic flow utilizing a DNS enhancement agent 202 deployed on a network device. Environment 200 is similar to that shown in the environment 100 of FIG. 1 with more detail relating to DNS query 210, enhanced DNS query 212, and DNS response 214. FIG. 2 also includes a client device 204, a client 206, and a DNS service 208. A DNS query 210 is sent from the client device 204 and intercepted by the DNS enhancement agent 202 deployed as a container or VM on the network device. The DNS enhancement agent 202 checks to see if the current configured DNS server destination complies with enterprise policy. If it does not, the DNS server configuration is overwritten with a DNS server destination that does comply with enterprise policy. The DNS enhancement agent 202 applies a cryptographic hash function, such as the secure hash algorithm 116 illustrated in FIG. 1, to contextually relevant metadata describing the client 206 and client device 204, to generate a hash value. The DNS enhancement agent 202 appends the hash value to the DNS query 210. The resulting enhanced DNS query 212, including the generated hash value in an additional records section as illustrated, is then sent from the DNS enhancement agent 202 to the DNS service 208. As illustrated in FIG. 2, the enhanced DNS query 212 includes the hash value in the additional records section of the query. When the enhanced DNS query 212 reached the DNS service 208, the enhanced DNS query 212 is processed by extracting the hash value, mapping the hash value to the real client and client metadata that was received by the DNS service over an out-of-band encrypted channel, and resolving the DNS query. A DNS response 214 is then sent back to the client device 204 from which the DNS query 210 originated. The DNS response 214 contains the same hash value in an additional records section of the DNS response 214, as the enhanced DNS query 212 contained.

Figure 3:
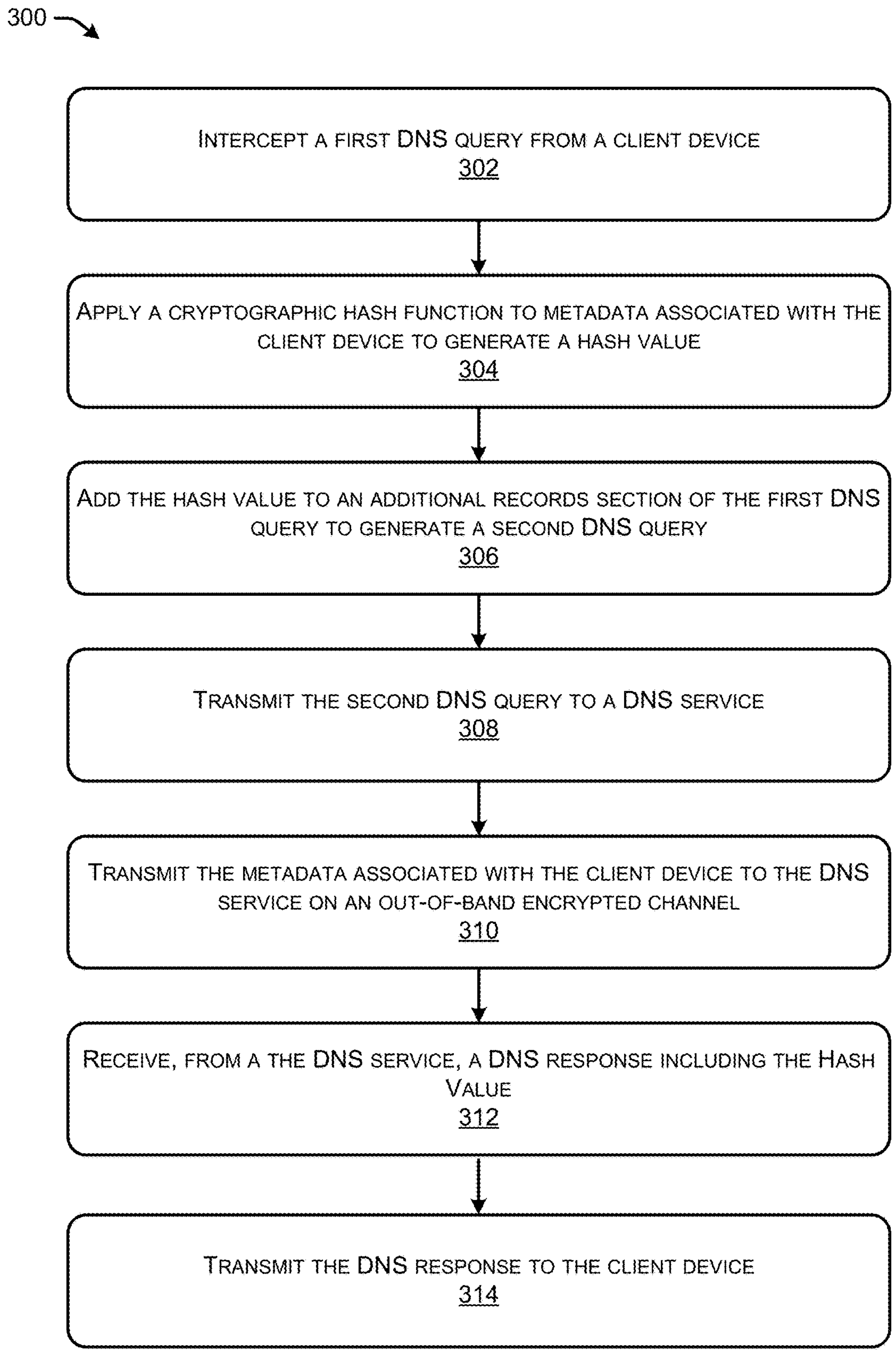
FIG. 3 illustrates a flow diagram of an example method for enhancing a DNS query with a hash value representing metadata associated with a client device.
Figure 4:
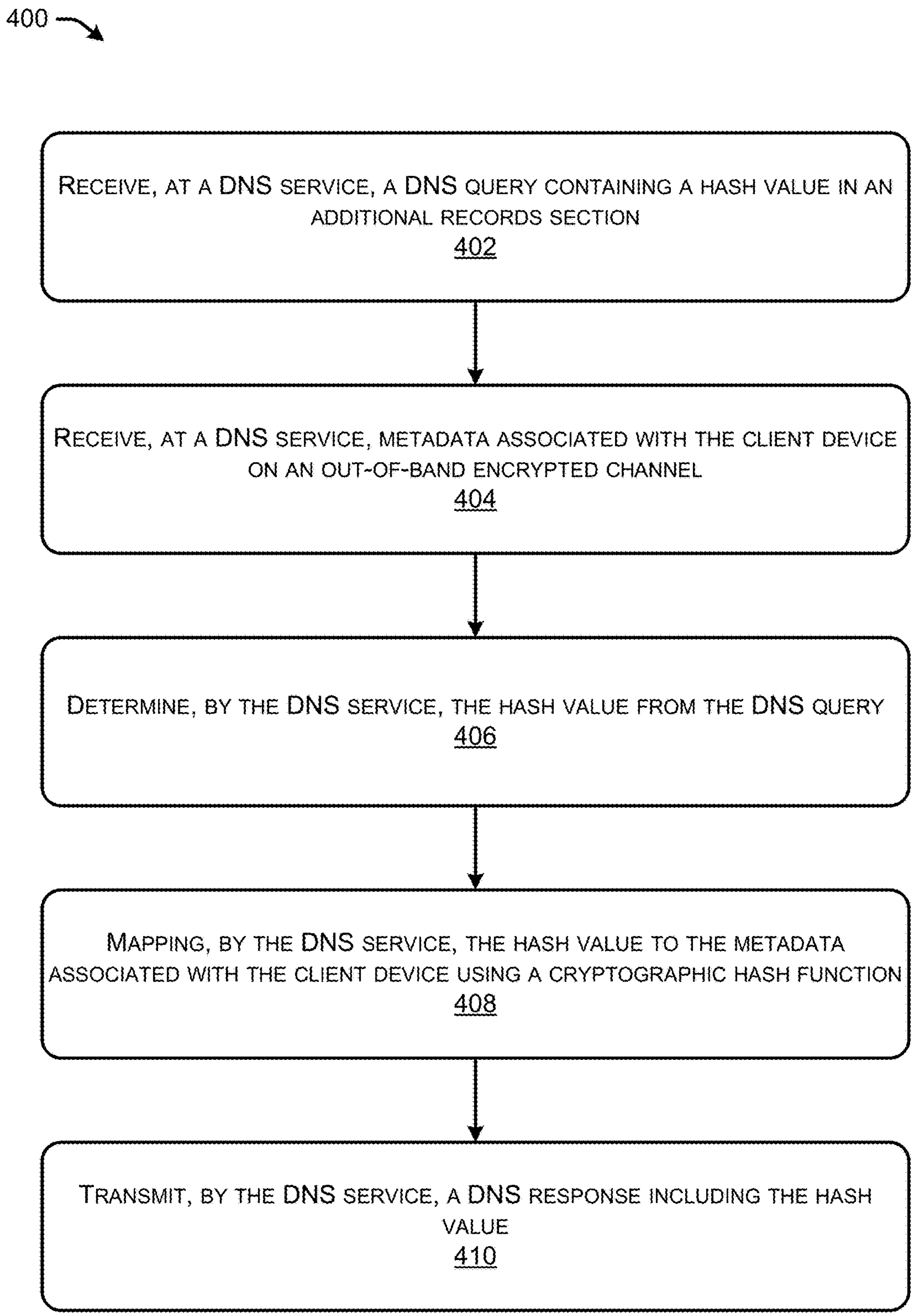
FIG. 4 illustrates a flow diagram of an example method for receiving an enhanced DNS query containing a hash value representing metadata associated with a client device and mapping the hash value to the associated metadata.

FIG. 3 and FIG. 4 illustrate flow diagrams of example processes 300 and 400 that illustrate aspects of the functions performed at least partly by the DNS enhancement agent 102 and DNS service 108 as described in FIG. 1. The logical operations described herein with respect to FIG. 3 and FIG. 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and FIG. 4 and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a data flow diagram of an example process 300 according to which a DNS enhancement agent intercepts a DNS query, enhances the DNS query with a hash value representing client device metadata, send the enhanced DNS query to a DNS service, receives a DNS response containing the hash value in the additional records section, and send the DNS response to the client device.

At operation 302, a first DNS query is intercepted by a DNS enhancement application or agent. The DNS enhancement application or agent may be deployed on a managed endpoint device, a network device (e.g., router, switch, firewall, etc.), or a standalone hardware device deployed inline at an enterprise network edge or service provider edge. The DNS enhancement application or agent intercepts DNS queries sent from endpoint client devices to DNS servers. For example, referring to FIG. 1, the DNS query 114 is sent from the client device 104 and intercepted by the DNS enhancement agent 102 that resides on a network device.

At operation 304, a cryptographic hash function is applied to metadata associated with the client device (the client device that sent the first DNS query in operation 302) to generate a hash value. The DNS enhancement application or agent applies the cryptographic hash function, such as a secure hash algorithm (e.g., SHA256) to metadata associated with the client device to generate a hash function. For example, referring again to FIG. 1, the secure hash algorithm 116 is applied to the client device metadata 112 to generate the hash value 118. Optionally, the hash may be salted, or additional unique data added to the metadata associated with the client device before the secure hash algorithm is applied to the metadata.

At operation 306, the hash value is added to an additional records section of the first DNS query to generate a second DNS query. The hash value generated in operation 304, is added as an OPT pseudo-RR to the additional records section of the first DNS query that was intercepted in operation 302, resulting in a second DNS query, an enhanced DNS query. FIG. 2 illustrates the first DNS query 210 with no hash value in the additional records section being intercepted by the DNS enhancement agent 202 that resides on the network device. The DNS enhancement agent applies the secure hash algorithm to the metadata associated with the client device 204 and adds the resulting hash value to the additional records section to produce the second DNS query 212. Similarly, FIG. 1 illustrates the second DNS query, the enhanced DNS query 120, after the DNS enhancement agent 102 has added the hash value 118 to the additional records section of the first DNS query 114, to generate the second DNS query 120.

At operation 308, the second DNS query is transmitted to a DNS service. Once the intercepted DNS query is enhanced with the hash value representing the client device metadata, the DNS enhancement application or agent sends the enhanced DNS query on to a DNS service, for example, Umbrella DNS. As depicted in FIG. 1, the enhanced DNS query 120 containing the hash value 118, is sent from the DNS enhancement agent 102 on the network device to the DNS service 108. Similarly, FIG. 2 illustrates the enhanced DNS query 212 being sent to the DNS service 208.

At operation 310, the metadata associated with the client device is transmitted to the DNS service on an out-of-band encrypted channel. For example, a REST API is used to transmit the real values of the metadata from the DNS enhancement application or agent to the DNS service. This operation in illustrated in FIG. 1 where the client device metadata 112 is sent to the DNS service 108 using a REST API 122.

At operation 312, the DNS enhancement application or agent, may receive a DNS response from the DNS service. The DNS response includes the hash value as an OPT pseudo-RR in an additional records section of the DNS response. Including the hash value in the DNS response increases DNS security by helping to avoid or identify forged and unauthorized DNS responses, as an unauthorized DNS response will not contain the original hash value sent in the DNS query. FIG. 2 illustrates the DNS response 214 being sent from the DNS service 208 to the DNS enhancement agent 202. The DNS response include the hash value in the additional records section of the response. Additionally, FIG. 1 illustrates the DNS response 124, that includes the hash value 118 in the additional records section of the message, being sent from the DNS service 108 to the DNS enhancement agent 102.

At operation 314, the DNS enhancement application or agent transmits the DNS response, that includes the hash value, to the client device from which the original first DNS query was sent. If the DNS response does not include the hash value, the DNS application or agent may not transmit the DNS response to the client device, but instead drop the packet. Referring to FIG. 2, when the DNS enhancement agent 202 receives the DNS response 214, the DNS enhancement agent 202 will look in the additional records section of the message and if the hash value is present, the DNS response 214 will be transmitted back to the client device 204. However, if the hash value is not present, the DNS enhancement agent 202 may drop the packet.

FIG. 4 illustrates a data flow diagram of an example process 400 according to which a DNS service receives an enhanced DNS query, receives metadata associated with a client device from which the DNS query originates, maps a hash value contained in the DNS query to the metadata associated with the client device, and transmitting a DNS response including the hash value, to the client device.

At operation 402, a DNS service receives a DNS query containing a hash value in an additional records section of the DNS query. A DNS service (e.g., Umbrella DNS) receives an enhanced DNS query from a DNS enhancement application or agent. The enhanced DNS query contains a hash value in an OPT pseudo-RR in the additional records section of the enhanced DNS query, the hash value representing metadata associated with a client device from which the DNS query originated. For example, referring to FIG. 1, the DNS service 108, receives an enhanced DNS query 120 from the DNS enhancement agent 102 that resides on a network device. Referring to FIG. 2, the DNS service 208 receives the enhanced DNS query 212, shown with an indication that the hash value is present in the additional records section of the message, from the DNS enhancement agent 202.

At operation 404, the DNS service receives metadata associated with the client device on an out-of-band encrypted channel. The real values of the metadata associated with the client device from which the DNS query originated are sent to the DNS service on an out-of-band encrypted channel, for example through a REST API. The real values of metadata are then stored in a metadata registry record. For example, FIG. 1 illustrates the client device metadata 112 being sent to the DNS service 108 using a REST API 122.

At operation 406, the DNS service determines the hash value from the DNS query. The DNS service looks in the additional records section of the DNS query and extracts the hash value stored there as an OPT pseudo-RR. Referring to FIG. 2 for example, the DNS service 208 receives the enhanced DNS query 212 and looks in the additional records section and extracts the hash value representing the client device metadata.

At operation 408, the DNS service maps the hash value (determined in operation 406) to the metadata associated with the client device (received in operation 404) using the same cryptographic has function (e.g., a secure hash algorithm such as SHA256) that was used to generate the hash value included in the DNS query (received in operation 402). FIG. 1 illustrates the client device metadata 112 that the DNS service received via the REST API 122, having the same secure hash algorithm 116 applied to generate the same hash value 118 that is present in the additional records section of the enhanced DNS query 120 that the DNS service received form the DNS enhancement agent 102.

At operation 410, the DNS service transmits a DNS response including the hash value. Once the DNS service resolves the DNS query, the DNS service sends the DNS response and includes the same hash value in the additional records section of the DNS response that was sent in the additional records section of the DNS query. For example, FIG. 2 illustrates the DNS response 214 having the hash value included in the additional records section of the message, being sent from the DNS service 208 to the DNS enhancement agent 202.

Figure 5:
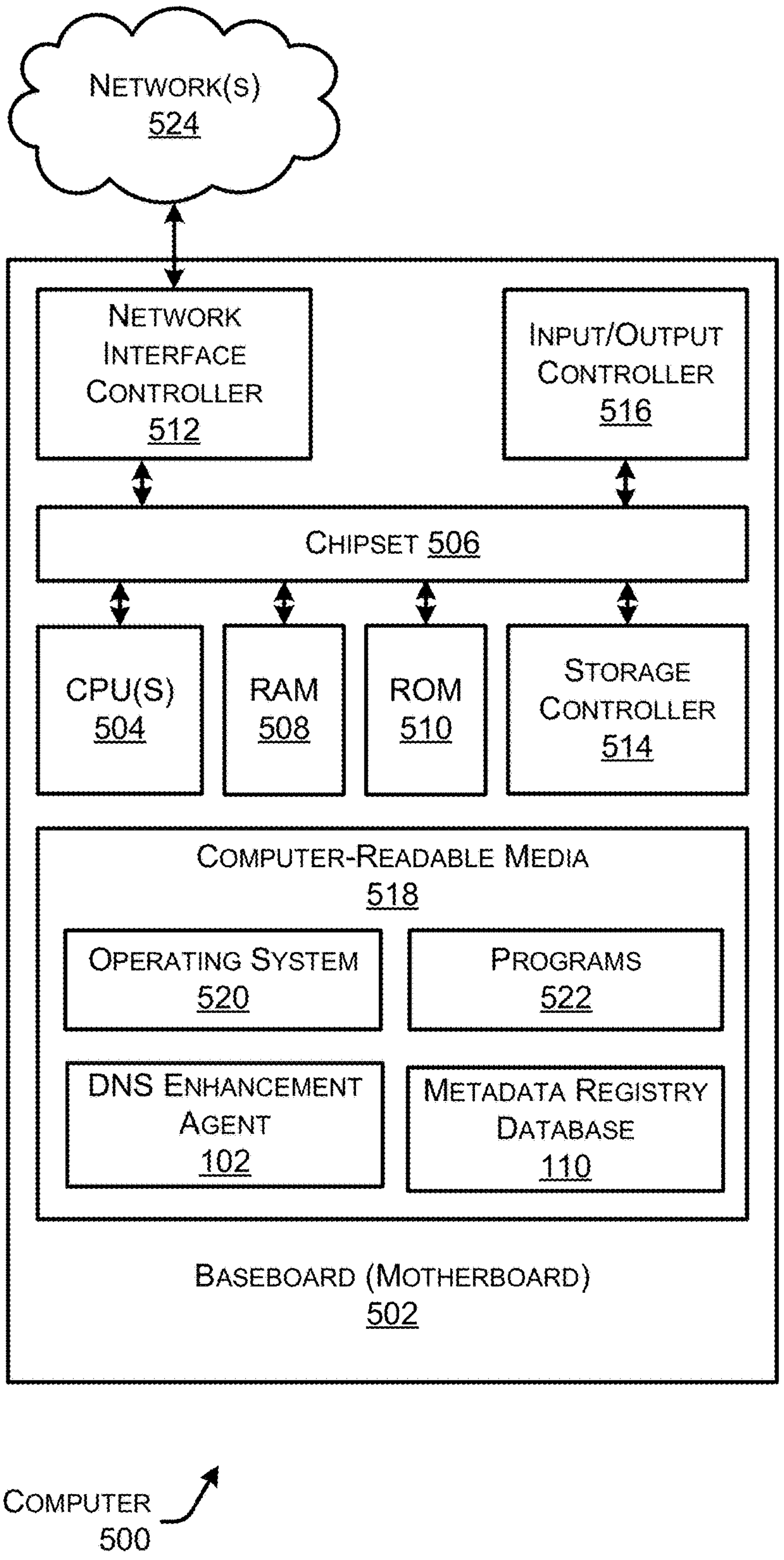
FIG. 5 illustrates a computer architecture diagram showing an example computer hardware architecture for implementing a network device that can be utilized to implement aspects of the various technologies presented herein.

FIG. 5 shows an example computer architecture for a computer 500 capable of executing program components for implementing the functionality described herein. The computer architecture shown in FIG. 5 illustrates a conventional server computer, workstation, desktop computer, laptop, tablet, network appliance, e-reader, smartphone, or other computing device, and can be utilized to execute any of the software components presented herein. The computer 500 may, in some examples, correspond to any of the servers, routers, or devices discussed herein. In some embodiments, computer 500 may include networked devices such as servers, switches, routers, hubs, bridges, gateways, modems, repeaters, access points, firewalls etc. Additionally, in some implementations, the programs or software discussed herein may be configured to perform operations performed by any of the devices. In some instances, the computer may correspond to any device described herein and be configured to perform operations performed by any device, and/or may be a system of devices that perform the techniques described herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 524. The chipset 506 can include functionality for providing network connectivity through a Network Interface Controller (NIC) 512, such as a gigabit Ethernet adapter. The NIC 512 is capable of connecting the computer 500 to other computing devices over the network 524. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by devices described herein, and or any components included therein, may be supported by one or more devices similar to computer 500. Stated otherwise, some or all of the operations performed by the DNS enhancement agent 102, the metadata registry record 110, and or any components included therein, may be performed by one or more computer devices 500 operating in a system.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described herein. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a router, a border router, a switch, and/or a server. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving on an out-of-band encrypted channel and independently of any Domain Name System (DNS) query, by a DNS service and from a DNS enhancement agent, metadata associated with a client device;
applying, by the DNS service, a cryptographic hash function to the metadata to determine a first hash value;
storing, by the DNS service and in a metadata registry record, the first hash value and corresponding metadata associated with the client device;
receiving, by the DNS service and from a DNS enhancement agent, a DNS query containing a second hash value in an additional records section;
mapping, by the DNS service, the second hash value to the metadata associated with the client device stored in the metadata registry record by applying the cryptographic hash function to the stored metadata and determining that a result of the cryptographic hash function matches the second hash value;
based at least in part on the second hash value corresponding to the first hash value and the metadata associated with the client device, resolving the DNS query; and
transmitting, by the DNS service, a DNS response including the second hash value in an additional records section of the DNS response.

2. The method of claim 1, wherein the metadata associated with the client device is received from an out-of-band Representational State Transfer (REST) Application Programming Interface (API).

3. The method of claim 2, further comprising:
detecting, by the DNS service, a change in metadata associated with the client device based on a third hash value in an additional records section of a DNS query; and
transmitting, to the client device, a REST API call requesting updated metadata for the client device.

4. The method of claim 3, further comprising:
receiving, by the DNS service and from the client device, the updated metadata for the client device; and
storing, by the DNS service and in a metadata registry record, the updated metadata for the client device and corresponding third hash value.

5. The method of claim 1, wherein the DNS query is an Extension Mechanisms for DNS (EDNS) query, the hash value is an option (OPT) type pseudo-Resource Record (pseudo-RR) in the additional records section of the EDNS query, the DNS response is an EDNS response, the hash value is an OPT type pseudo-RR in the additional records section of the EDNS response.

6. The method of claim 1, wherein a security policy is applied to the client device based on the metadata associated with the client device included in the hash value.

7. The method of claim 6, wherein the security policy is applied to a client device private IP address that is behind a Network Address Translation (NAT) public IP address.

8. A system comprising:
one or more processors; and
one or more non-transitory computer-readable media storing computer-executable instructions that, when executed by the one or more processors, cause the one or more processors to perform operations comprising:
receiving on an out-of-band encrypted channel and independently of any Domain Name System (DNS) query, by a DNS service and from a DNS enhancement agent, metadata associated with a client device;
applying, by the DNS service, a cryptographic hash function to the metadata to determine a first hash value;
storing, by the DNS service and in a metadata registry record, the first hash value and corresponding metadata associated with the client device;
receiving, by the DNS service and from a DNS enhancement agent, a DNS query containing a second hash value in an additional records section;
mapping, by the DNS service, the second hash value to the metadata associated with the client device stored in the metadata registry record by applying the cryptographic hash function to the stored metadata and determining that a result of the cryptographic hash function matches the second hash value;
based at least in part on the second hash value corresponding to the first hash value and the metadata associated with the client device, resolving the DNS query; and
transmitting, by the DNS service, a DNS response including the second hash value in an additional records section of the DNS response.

9. The system of claim 8, wherein the metadata associated with the client device is received from an out-of-band Representational State Transfer (REST) Application Programming Interface (API).

10. The system of claim 9, the operations further comprising:

detecting, by the DNS service, a change in metadata associated with the client device based on a third hash value in an additional records section of a DNS query; and transmitting, to the client device, a REST API call requesting updated metadata for the client device.

11. The system of claim 10, the operations further comprising:

receiving, by the DNS service and from the client device, the updated metadata for the client device; and storing, by the DNS service and in a metadata registry record, the updated metadata for the client device and corresponding third hash value.

12. The system of claim 8, wherein the DNS query is an Extension Mechanisms for DNS (EDNS) query, the hash value is an option (OPT) type pseudo-Resource Record (pseudo-RR) in the additional records section of the EDNS query, the DNS response is an EDNS response, the hash value is an OPT type pseudo-RR in the additional records section of the EDNS response.

13. The system of claim 8, wherein a security policy is applied to the client device based on the metadata associated with the client device included in the hash value.

14. The system of claim 13, wherein the security policy is applied to a client device private IP address that is behind a Network Address Translation (NAT) public IP address.

15. One or more non-transitory computer-readable media storing instructions that, when executed, cause one or more processors to perform operations comprising:

receiving on an out-of-band encrypted channel and independently of any Domain Name System (DNS) query, by a DNS service and from a DNS enhancement agent, metadata associated with a client device;

applying, by the DNS service, a cryptographic hash function to the metadata to determine a first hash value;

storing, by the DNS service and in a metadata registry record, the first hash value and corresponding metadata associated with the client device;

receiving, by the DNS service and from a DNS enhancement agent, a DNS query containing a second hash value in an additional records section;

mapping, by the DNS service, the second hash value to the metadata associated with the client device stored in the metadata registry record by applying the cryptographic hash function to the stored metadata and determining that a result of the cryptographic hash function matches the second hash value;

based at least in part on the second hash value corresponding to the first hash value and the metadata associated with the client device, resolving the DNS query; and transmitting, by the DNS service, a DNS response including the second hash value in an additional records section of the DNS response.

16. The one or more non-transitory computer-readable media of claim 15, wherein the metadata associated with the client device is received from an out-of-band Representational State Transfer (REST) Application Programming Interface (API).

17. The one or more non-transitory computer-readable media of claim 16, the operations further comprising:

detecting, by the DNS service, a change in metadata associated with the client device based on a third hash value in an additional records section of a DNS query; and transmitting, to the client device, a REST API call requesting updated metadata for the client device.

18. The one or more non-transitory computer-readable media of claim 17, the operations further comprising:

receiving, by the DNS service and from the client device, the updated metadata for the client device; and storing, by the DNS service and in a metadata registry record, the updated metadata for the client device and corresponding third hash value.

19. The one or more non-transitory computer-readable media of claim 15, wherein a security policy is applied to the client device based on the metadata associated with the client device included in the hash value.

20. The one or more non-transitory computer-readable media of claim 19, wherein the security policy is applied to a client device private IP address that is behind a Network Address Translation (NAT) public IP address.

* * * * *